United States Patent
Hosotani et al.

(10) Patent No.: US 6,736,746 B2
(45) Date of Patent: May 18, 2004

(54) VEHICLE-RUNNING CONTROL DEVICE

(75) Inventors: Takashi Hosotani, Hachiouji (JP); Satoshi Hisamatsu, Machida (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/973,047

(22) Filed: Oct. 10, 2001

(65) Prior Publication Data

US 2002/0045514 A1 Apr. 18, 2002

(30) Foreign Application Priority Data

Oct. 13, 2000 (JP) .................................. 2000-313628

(51) Int. Cl.$^7$ ............................................. F16H 31/00
(52) U.S. Cl. ...................... 475/116; 477/159; 477/162; 192/3.33; 192/3.58
(58) Field of Search ..................... 475/116; 477/92, 477/95, 156, 159, 162, 74, 175, 176; 192/3.27, 3.33, 3.58, 3.61–3.63, 87.19, 51; 74/730–733.1

(56) References Cited

U.S. PATENT DOCUMENTS

| | | | | |
|---|---|---|---|---|
| 4,296,645 A | * | 10/1981 | Jameson ........................ 475/52 |
| 4,735,113 A | | 4/1988 | Yamamuro et al. |
| 4,790,420 A | * | 12/1988 | Hata et al. ................ 192/111 A |
| 4,961,146 A | | 10/1990 | Kajiwara |
| 5,048,655 A | * | 9/1991 | Seeba ........................ 477/175 |
| 5,083,646 A | * | 1/1992 | Takeuchi et al. ........... 192/3.57 |
| 5,101,688 A | * | 4/1992 | Pearce et al. .............. 192/3.58 |
| 5,103,928 A | * | 4/1992 | Danner et al. ............... 180/197 |
| 5,509,520 A | * | 4/1996 | Evans et al. ................ 192/3.23 |
| 5,520,593 A | * | 5/1996 | Yesel et al. ..................... 477/77 |
| 5,549,525 A | | 8/1996 | Wendel |
| 5,632,706 A | * | 5/1997 | Kremmling et al. .......... 477/74 |
| 5,941,792 A | * | 8/1999 | Amendt et al. ................ 477/74 |
| 6,033,340 A | * | 3/2000 | Amendt et al. ................ 477/77 |
| 6,318,530 B1 | * | 11/2001 | Asada ........................ 192/3.58 |

FOREIGN PATENT DOCUMENTS

| | | |
|---|---|---|
| EP | 0393910 A2 | 10/1990 |
| EP | 0602750 A2 | 6/1994 |
| JP | 61-105353 | 5/1986 |
| JP | 2-176125 | 7/1990 |
| JP | 11-166617 | 6/1999 |
| JP | 2001-004022 | 1/2001 |

\* cited by examiner

*Primary Examiner*—Roger Pang
*Assistant Examiner*—David D. Le
(74) *Attorney, Agent, or Firm*—McDermott, Will & Emery

(57) ABSTRACT

In a vehicle wherein the output of an engine is transmitted to an output shaft via a torque converter and clutches, for forward/reverse change-over, a control device is provided which can control a creep phenomenon.

The control device comprises a change-over valve provided in a circuit for supplying the pressurized fluid to the clutches, and the pressure control valve which controls the fluid pressure to the clutches.

When the accelerator pedal is not depressed, the pressure control valve is controlled to make the vehicle speed lie within a predetermined target speed range.

11 Claims, 3 Drawing Sheets

VEHICLE-RUNNING CONTROL DEVICE

FIELD OF THE INVENTION

This invention relates to a vehicle-running control device which changes speed and transmits engine power by a torque converter.

BACKGROUND OF THE INVENTION

In a vehicle where speed is changed and engine power is transmitted by a torque converter, when a shift lever is in a forward position or reverse position, a creep phenomenon occurs wherein the vehicle moves at a very low speed even if the accelerator pedal is not depressed. This phenomenon occurs because the torque converter transfers power according to the output of the idle rotation of the engine. In an industrial vehicle, especially a fork lift truck provided with a torque converter, when the vehicle is running very slowly for picking up or discharging a load, workability is improved by making use of this creep phenomenon. However, when an operator familiar with industrial vehicles without a torque converter operates a vehicle with a torque converter, the vehicle may move unintended by the operator.

Tokkai-Hei 11-166617 published by the Japanese Patent Office in 1999 discloses a vehicle-running control device for eliminating the disadvantages due to creep. For example, in the state where the accelerator pedal is not depressed even if the shift lever is in the forward position (or reverse position), this vehicle-running control device prevents supply of oil pressure for engaging the forward clutch (or reverse clutch), and thereby prevents the vehicle from creeping.

SUMMARY OF THE INVENTION

However, if the creep phenomenon specific to a vehicle with a torque converter is merely suppressed, the easy operability inherent in such a vehicle is impaired. In particular, the operability of an operator who attempts to use creep effectively is impaired. Thus, it is difficult for the vehicle-running control device of the prior art to satisfy all operators.

It is therefore an object of this invention to provide a vehicle-running control device which can control the creep of a vehicle equipped with a torque converter.

In order to achieve above object, this invention provides a vehicle-running control device having a torque converter connected to an engine, and a forward clutch and reverse clutch for transmitting the torque from the torque converter to an output shaft.

The vehicle-running control device comprises a hydraulic circuit for operating one of the forward clutch and reverse clutch, the hydraulic circuit having a change-over valve which can be prevented from supplying the pressurized fluid to both the forward clutch and reverse clutch, and a pressure control valve which adjusts the pressure of the pressurized fluid supplied to the operating clutch; a first sensor for detecting that the change-over valve supplies the pressurized fluid to the forward clutch or the reverse clutch; a second sensor for detecting that the accelerator pedal is released; a sensor for detecting a vehicle speed; and a controller.

The controller functions to compare a predetermined target speed range with the vehicle speed, when the change-over valve supplies the pressurized fluid to one of the forward clutch and reverse clutch and the accelerator pedal is not depressed, and to command the pressure control valve to control the torque transmitted by the operating clutch according to the comparison result so that the vehicle speed is within the predetermined target speed range.

The details as well as other features and advantages of this invention are set forth in the remainder of the specification and are shown in the accompanying drawings.

DESCRIPTION OF THE PREFERRED EMBODIMENTS

Figure 1:
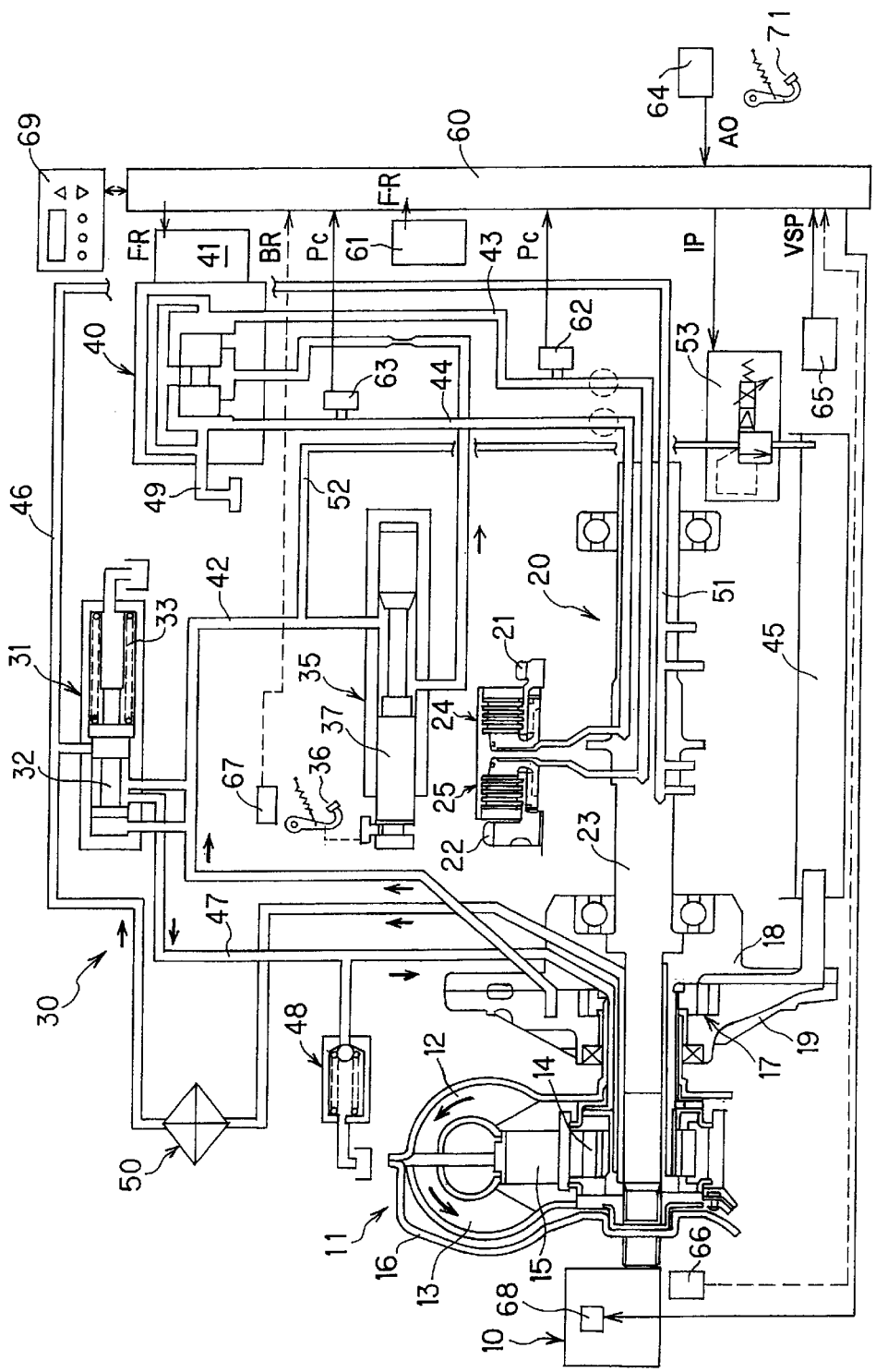
FIG. 1 is a schematic block flow diagram of a vehicle-running control device according to this invention.

Referring to FIG. 1, a vehicle-running control device (comprising a hydraulic circuit 30) according to the present invention will be described.

The drive force of an engine 10 is input to a transmission 20 via a torque converter 11, and drives a forward reduction gear 21 or reverse reduction gear 22 of the transmission 20. After the rotation of the engine 10 is slowed down by the transmission 20, it is transmitted to drive wheels via a drive shaft (output shaft), a final drive gear and a differential gear, not shown. The engine 10 drives the vehicle in the forward direction or the reverse direction.

The torque converter 11 comprises a pump impeller 12, turbine runner 13, and a stator 15 whereof the rotation direction is regulated by a one-way clutch 14. The torque converter 11 operates in a converter region wherein the torque ratio of the turbine runner 13 to pump impeller 12 is 1 or less, and in a coupling region wherein the torque ratio is higher than 1, by circulating its internal fluid (oil) between the pump impeller 12, turbine runner 13 and stator 15. In the converter region, a stall torque arises.

The output of the torque converter 11, after being transmitted to the input shaft 23 of the transmission 20 from the turbine runner 13, drives the forward reduction gear 21 (or reverse reduction gear 22) via a forward clutch 24 (or reverse clutch 25).

The hydraulic circuit 30 for controlling engagement/disengagement of the forward clutch 24 and the reverse clutch 25 is described below.

In the hydraulic circuit 30, a regulating valve 31 adjusts the pressure of the pressurized fluid (oil) from a pump 17. An adjusted line pressure PL is delivered to an inching valve 35 and a change-over valve 40 via a line pressure circuit 42. A change-over valve 40 transmits a pressure selectively to the forward clutch 24 or the reverse clutch 25 via a pressure modulator valve, not shown, according to the change-over position. Thus the hydraulic circuit 30 operates one of the forward clutch 24 and the reverse clutch 25.

The pump 17 is formed between a front cover 18 and a pump case 19 of the transmission 20, and is usually driven by the engine 10 via a converter cover 16. The pump 17 aspirates fluid from an oil reservoir 45, and discharges it to the line pressure circuit 42 connected to a regulating valve 31.

When one end of the spool 32 in the regulating valve 31 receives the line pressure PL of the line pressure circuit 42, the regulating valve 31 is adjusted so that the line pressure PL is a specified pressure Pm set by a regulator spring 33.

The fluid redundant in the adjustment operation is discharged to a lubricating circuit 46 and a torque converter supply circuit 47. The pressure of the torque converter supply circuit 47 is adjusted to the converter pressure by a torque converter relief valve 48.

An inching valve 35 is a valve which operates in the initial stage of the depression stroke of a inching brake pedal 36. By throttling the line pressure circuit 42 in the initial stage of depression of the inching brake pedal 36 by a spool 37 in the inching valve 35, this valve adjusts the clutch pressure Pc so that the forward or reverse clutch is in a slip state (half-clutch state). The inching valve 35 inches the vehicle by adjusting the torque transmitted by the forward clutch 24 or reverse clutch 25.

The change-over valve 40 is a solenoid valve which operates according to the position of a shift lever (not shown) which selects a forward position, reverse position or a neutral (non-running) position. The change-over valve 40 is controlled by an electronic control circuit 41 comprising a solenoid. A forward signal or reverse signal (F-R signal) is input to the electronic control circuit 41 from a forward/reverse detection switch 61 for detecting the forward or reverse position of a shift lever. The forward signal indicates that the position of the shift lever is in the forward position. The reverse signal indicates that the position of the shift lever is in the reverse position.

The signal F-R from the forward/reverse detection switch 61 is input into the electronic control circuit 41 via a controller 60. The signal F-R may be input directly into the electronic control circuit 41 of the change-over valve 40 from the forward/reverse detection switch 61.

Moreover, the change-over valve 40 may be mechanically changed over by a shift lever. In this case, the signal F-R may be a signal which indicates that one of forward and reverse positions of the change-over valve 40 has been selected.

When neither of the signals is input due to the selection of the neutral position, the change-over valve 40 disengages both the clutches 24 and 25 by connecting the forward and reverse clutch circuits 43, 44 to a drain passage 49.

When a forward signal is detected by the forward/reverse detection switch 61, the change-over valve 40 connects the line pressure circuit 42 to the forward clutch circuit 44 in order to operate the forward clutch 24, and connects the reverse clutch circuit 43 to the drain passage 49 in order to prohibit the operation the reverse clutch 25. When a reverse signal is detected by the forward/reverse detection switch 61, the change-over valve 40 connects the line pressure circuit 42 to the reverse clutch circuit 43 in order to operate the reverse clutch 25, and connects the forward clutch circuit 44 to the drain passage 49 in order to prohibit the operation the forward clutch 24.

After the fluid of the lubricating circuit 46 combines with the fluid returning via an oil cooler 50 from the torque converter 11, it flows into a passage 51 in an input shaft 23 of the transmission 20, lubricates sliding parts of the transmission, not shown, and is returned to an oil reservoir 45.

The line pressure PL from a regulating valve 31 is adjusted by a pressure control valve 53 (pressure control means) interposed in a pressure control circuit 52 which branches from the line pressure circuit 42 and leads to the oil reservoir 45. Specifically, the line pressure circuit 42 and pressure control circuit 52 are adjusted to the specified pressure PL when the pressure control valve 53 is completely closed, and they are adjusted to the adjustment value of the pressure control valve 53 when the adjustment value of the pressure control valve 53 is lower than the line pressure PL.

The pressure control valve 53 functions as an electromagnetic proportional relief valve. It opens and closes in response to the pressure value set by a command value IP, and adjusts the fluid pressure of the upstream pressure control circuit 52 and line pressure circuit 42, by discharging the fluid of the pressure control circuit 52 to the oil reservoir 45.

A duty control solenoid valve ("PWM valve") which opens and closes according to a duty ratio, may be used as the pressure control valve 53.

In FIG. 1, although the pressure control valve 53 is provided independently, it may be formed together with another valve, for example, the regulating valve 31.

When the pressure control valve 53 is combined with the regulating valve 31, the regulating valve 31 of FIG. 1 is not installed, and instead, the pressure control valve 53 has the function of the regulating valve 31, adjusting the clutch pressure Pc from zero to a specified pressure Pm.

In this case, instead of the regulating valve 31, the pressure control valve 53 makes a constant amount of fluid flow through the torque converter supply circuit 47, and the remainder flow through the lubricating circuit 46.

The inching valve 35 and the pressure control valve 53 can also be formed in one piece. In this case, the inching valve 35 of FIG. 1 is not installed, and the pressure control valve 53 may be given the following functions of the inching valve 35. When the inching brake pedal 36 is depressed shallowly, the pressure of the clutch Pc is adjusted to a pressure value at which the forward clutch 24 or the reverse clutch 25 slips according to the depression amount.

When both the pressure control valve 53 and the inching valve 35 do not operate, the line pressure PL forces the forward or reverse clutch 24 or 25 to be engaged without slipping and to transmit the total drive force. When either the pressure control valve 53 or the inching valve 35 operate, the line pressure PL forces the forward or reverse clutch 24 or 25 to be engaged with slipping and to transmit part of the total drive force.

The slip degree of the forward/reverse clutches 24, 25 is inversely proportional to the clutch pressure Pc set by the pressure control valve 53 and the inching valve 35.

A pressure modulating valve, not shown, is provided for example in a part shown by a circle with a broken line in the middle of the clutch circuits 43, 44.

This pressure modulating valve prevents the transmitted torque of the forward/reverse clutches 24, 25 from increasing sharply due to sharp increase of the clutch pressure Pc accompanying the operation of the change-over valve 40, which would give the vehicle a selection shock. The pressure modulating valve operates so that the clutch pressure Pc may be gradually increased with the elapsed time.

A controller 60 comprises a programmable memory (for example, an electrically erasable programmable memory (EEPROM)), a central processing unit (CPU), a read-only memory (ROM), a random access memory (RAM) and an input/output (I/O) interface. The ROM stores a program equivalent to the flowchart of FIG. 2. The CPU executes the program repeatedly every 10 milliseconds by timer interruption, while the vehicle is operating. The RAM temporarily stores data required for execution of the program.

The controller 60 controls the pressure value Pc of the operating clutch according to the vehicle speed. The pressure value Pc of the pressurized fluid supplied to the operating clutch is detected by either of pressure sensors 62, 63. The first pressure sensor 62 detects the pressure of the reverse clutch circuit 43. The second pressure sensor 63 detects the pressure of the forward clutch circuit 44. A pressure value Pc is input to the controller 60. Further, an accelerator signal A0 from an accelerator switch 64 for detecting the depression of an accelerator pedal 71, a vehicle speed signal VSP from a vehicle speed sensor 65 for detecting the running speed of the vehicle, and the forward/reverse signal F-R from the forward/reverse detection switch 61 for detecting the forward or reverse operation of the shift lever are input to the controller 60. Based on these signals, the controller 60 drives the solenoid of the electronic control circuit 41 for controlling the change-over valve 40, and outputs a command value IP to the pressure control valve 53.

An engine speed sensor 66 outputs an engine speed signal Ne of the engine 10 to the controller 60, and the brake switch 67 outputs a brake signal BR which shows the depression of the inching brake pedal 36 to the controller 60.

An idle-up device 68 for increasing the idle rotation speed of the engine 10 operates based on a command signal of the controller 60.

A console panel 69 connected to the controller 60 comprises a display part, a selection button, a determination button, an I/O interface, and adjustment dials (or rise and fall buttons) for setting data required for controlling the vehicle. The data are stored in a programmable memory of the controller 60 via the I/O interfaces of the console panel 69 and the controller 60, and they can be set or modified by the operator using the console panel 69.

Each of the adjustment dials is linked to a variable resistor connected to a constant current source, and the rotation of the adjustment dial changes the voltage across the variable resistor. The voltage across the variable resistor is digitized by an analog to digital converter, and then it is output from the I/O interface of the console panel 69 to the I/O interface of the controller 60.

The data required for control includes a first set vehicle speed V0 which is used for setting a range of the target speed when the vehicle is running under creep, and a second set vehicle speed V3 related to operation of the engine brake.

Figure 2:
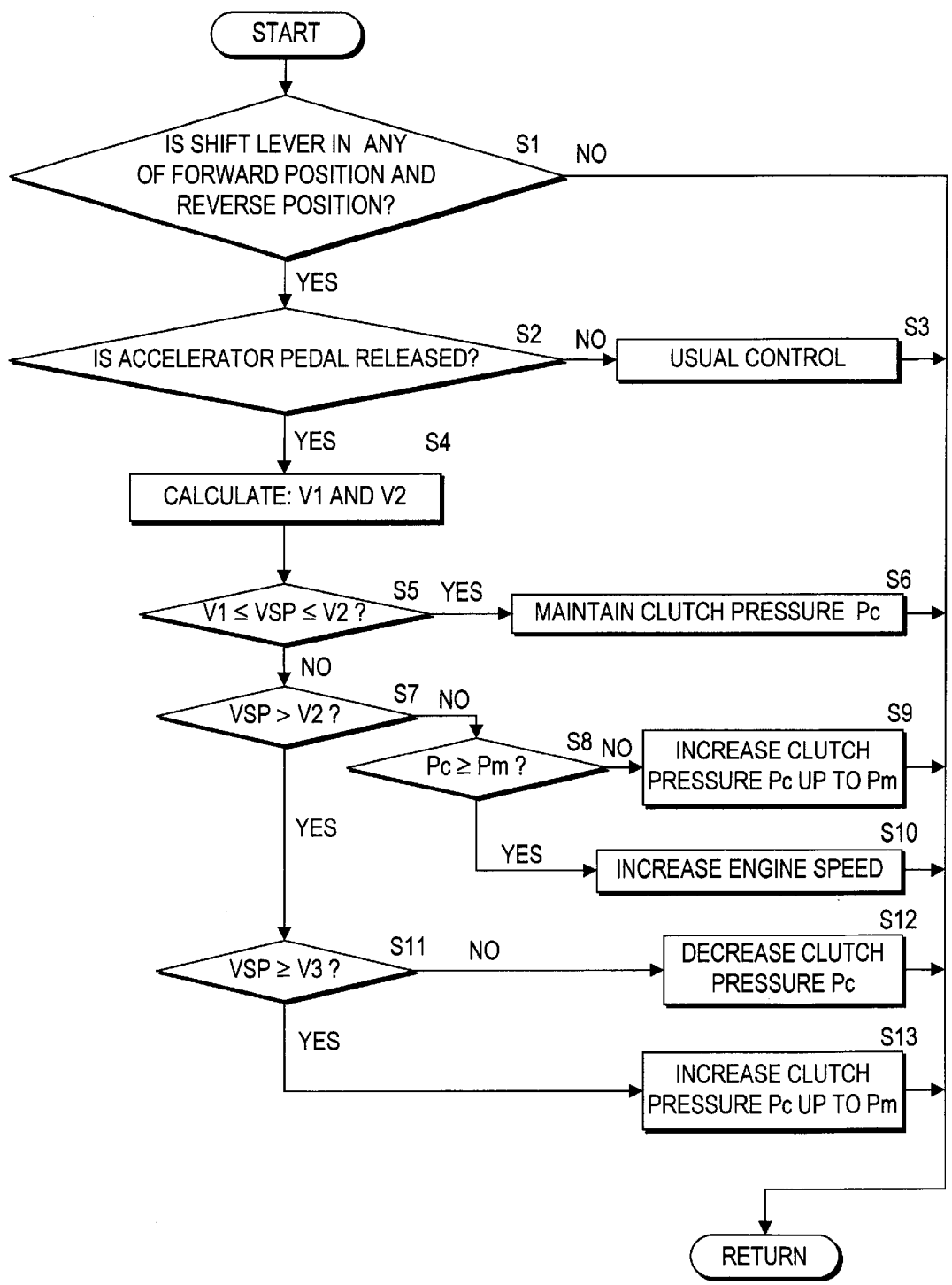
FIG. 2 is a flowchart describing control of the controller according to this invention.

Referring to the flowchart of FIG. 2, the control program performed by the controller 60 will be described.

First, in a step S1, it is determined whether or not the shift lever is in any of a forward position and a reverse position, based on the forward/reverse operation signal F-R from the forward/reverse detection switch 61. When an F-R signal is not input from the forward/reverse detection switch 61, the result is determined as NO, and the program is returned.

When the shift lever is in the forward position or reverse position in the step S1, the program proceeds to a step S2. In the step S2, it is determined, based on the accelerator signal A0 from the accelerator switch 64, whether the accelerator pedal 71 is released or depressed. When the accelerator signal A0 is detected, it is determined that the accelerator pedal 71 is depressed.

When the accelerator pedal is depressed, the program proceeds to a step S3 and the usual control is performed. The depression of the accelerator pedal 71 means that the vehicle is starting normally. In the step S3, output of the command value IP to the pressure control valve 53 is prohibited. That is, control of the pressure control valve 53 is not performed.

In the usual control, the pressure control valve 53 remains closed. Therefore, the clutch pressure Pc of the operating clutch 24, 25 increases up to the pressure regulated by the regulating valve 31, i.e., the specified pressure Pm. The specified pressure Pm is the pressure causing the complete engagement of the clutch 24, 25, and can be experimentally determined. However, when the inching brake pedal 36 is shallowly depressed, the clutch pressure Pc decreases to a pressure corresponding to the depression amount of the inching brake pedal 36 due to the inching valve 35.

When the accelerator pedal 71 is released in the step S2, the program proceeds to a step S4, and creep control for controlling the creep of the vehicle starts.

In the step S4, the present vehicle speed VSP of the vehicle is detected from the vehicle speed sensor 65, and the first set vehicle speed V0 and second set vehicle speed V3 are read from the programmable memory of the controller 60. The first set vehicle speed V0 and second set vehicle speed V3 may be read directly from the voltage across the respective variable resistors linked to adjustment dials.

The minimum target speed V1 and the maximum target speed V2 are set in order to define the range of the target speed when the vehicle is running under creep. Here, $V<V0<V2$. The controller 60 sets V1 and V2 based on the first set vehicle speed V0 as follows: $V1=V0-dV1$ and $V2=V1+dV2$. The difference $(dV1+dV2)$ between V1 and V2 is set from 0.5 to 1.0 km/hr. The setting of V1 and V2 ensures stability of control of the vehicle speed VSP, and has the effect of preventing chatter. The values of V1 and V2 may be made equal to the value of V0 when it is not necessary to prevent chatter. That is, the width of the predetermined target speed range may be substantially zero.

Subsequently, the program proceeds to a step S5. In the step S5, it is determined whether or not the vehicle speed VSP is within the predetermined range of target speed from the minimum value V1 to the maximum value V2.

If the vehicle speed VSP is within the range of the target speed from V1 to V2, the program will proceed to a step S6. In the step S6, a command value IP which maintains the current clutch pressure Pc is output to the pressure control valve 53. Due to this control, the engagement force of the operating clutch (forward clutch 24 or reverse clutch 25) is adjusted so that the vehicle speed VSP is in the target speed range from V1 to V2.

When the vehicle speed VSP is outside the range of the target speed in the step S5, the program proceeds to a step S7. In the step S7, it is determined whether or not the vehicle speed VSP is higher than the maximum value V2 of the target speed. This determination is equivalent to determining whether the vehicle speed VSP is higher than the maximum value V2 of the target speed, or the vehicle speed VSP is lower than the minimum value V1 of the target speed.

When the vehicle speed VSP does not exceed the maximum value V2 of the target speed, namely when $VSP<V1$, the program proceeds to a step S8. In the step S8, it is determined whether or not the clutch pressure Pc has increased to the specified pressure Pm. In other words, it is determined whether or not the transmitted torque of the operating clutch (forward clutch 24 or reverse clutch 25) is sufficient.

If the clutch pressure Pc is less than the specified pressure Pm, the routine proceeds to a step S9. In the step S9, the command value IP which increases the clutch pressure Pc to the specified pressure Pm is output to the pressure control valve 53. In this way, the transmitted torque of the operating clutch (forward clutch 24 or reverse clutch 25) increases, and the vehicle speed VSP increases as a result.

When the clutch pressure Pc is equal to or higher than the specified pressure Pm in the step S8, the program proceeds to a step S10. In this case, the transmitted torque of the operating clutch (forward clutch 24 or reverse clutch 25) is sufficient. In the step S10, the idle-up device 68 of the engine 10 is commanded to operate. In this way, the vehicle speed VSP is made to increase by increasing the engine speed Ne of the engine 10. In particular, the vehicle speed VSP can be rapidly increased immediately after the vehicle has started.

When the vehicle speed VSP exceeds the maximum value V2 of the target speed in the step S7, the routine proceeds to a step S11. In the step S11, it is determined whether the vehicle speed VSP is equal to or higher than the second set vehicle speed V3.

When the vehicle speed VSP is less than the second set vehicle speed V3, the program proceeds to a step S12. In the step S12, decompression of the clutch pressure Pc is started due to the output of the command value IP. In order that the vehicle speed VSP is not largely different from the first set vehicle speed V0, the transmitted torque is decreased by reducing the clutch pressure Pc. Thus, by reducing the drive force, the vehicle speed VSP is decreased towards the first set vehicle speed V0.

When the vehicle speed VSP is determined to be equal to or higher than the set vehicle speed V3 in the step S11, the program proceeds to a step S13. In the step S13, the command value IP for increasing the clutch pressure Pc to the specified pressure Pm is output. Thereby, the engine brake starts to operate efficiently.

In the above control, the step S4 to the step S13 are steps related to creep control.

Figure 3:
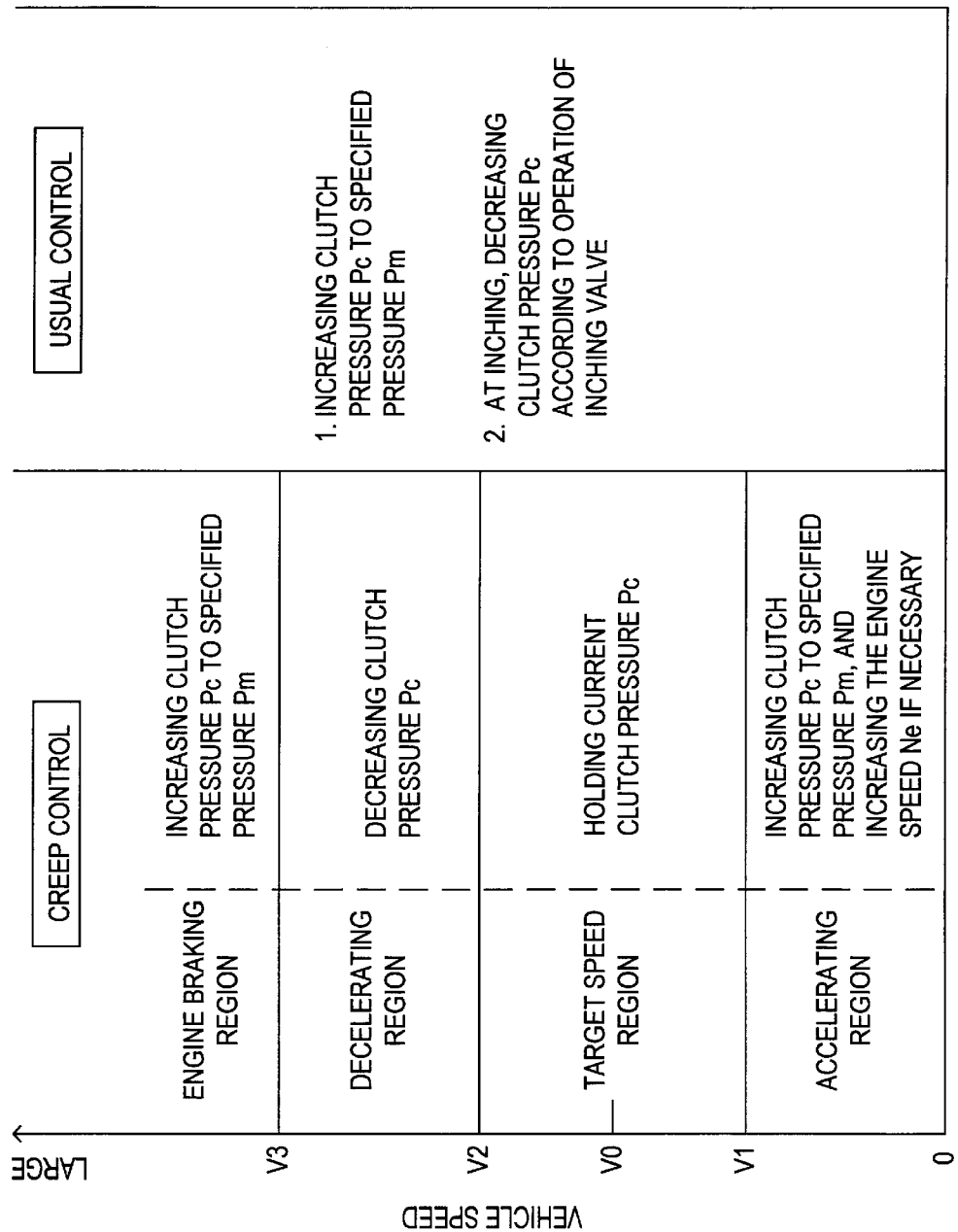
FIG. 3 is a diagram describing control of the controller according to this invention.

FIG. 3 is a diagram which summarizes the control of the clutch pressure Pc shown above. This diagram describes the control of the clutch pressure Pc according to regions divided by the value of the vehicle speed VSP.

In the usual control, as shown in FIG. 3, the fluid pressure of the forward clutch 24 or reverse clutch 25 is boosted by the controller 60 to the specified pressure Pm which is determined by the regulating valve 31. In particular, when the inching valve 35 operates due to shallow depression of the inching brake pedal 36, the control, which reduces the clutch pressure Pc according to the operation of the inching valve 35, is performed.

In creep control, different control is performed according to whether the vehicle speed VSP is in a target speed region from V1 to V2, a vehicle speed region lower than V1 (accelerating region), a vehicle speed higher than V2 (decelerating region), or an engine braking region higher than a second set vehicle speed V3.

When the vehicle speed VSP is in the target speed region, the controller 60 holds the clutch pressure Pc constant, when the vehicle speed VSP is below the target speed region, the controller 60 increases the clutch pressure Pc to the specified pressure Pm, when the vehicle speed VSP exceeds the target speed region but is below V3, the controller 60 reduces the clutch pressure Pc, and when the vehicle speed VSP exceeds V3, the controller 60 increases the clutch pressure Pc to the specified pressure Pm so that the engine brake starts to operate efficiently. Thus, when the vehicle is subject to creep, the controller 60 controls the vehicle speed VSP within the target speed region.

During the actual running of the vehicle, the above controls are performed as follows.

(A) When the Vehicle is Starting

After putting the engine 10 into operation, the operator shifts the shift lever to a forward or a reverse position with the accelerator pedal 71 released.

As the vehicle speed VSP is less than the minimum value V1 of the target speed, the vehicle speed VSP increases with the increase in the clutch pressure Pc.

When the vehicle speed VSP enters the target speed region V1–V2, the clutch pressure Pc at that time is maintained, and the vehicle speed VSP will stop at the target speed region V1–V2.

When, due to the vehicle climbing a hill, etc., the vehicle speed VSP does not reach the target speed region V1–V2 although the clutch pressure Pc has increased to the specified pressure Pm, the vehicle speed is increased to the target speed region V1–V2 by increasing the idle engine speed of the engine 10.

(B) When the Vehicle is Moving Down a Hill

Even if the operator releases the accelerator pedal 71 due to the downward slope, the vehicle speed VSP increases to exceed the target speed region V1–V2, and enters a decelerating region. First, the clutch pressure Pc is reduced and it is attempted to decrease the vehicle speed VSP.

However, as the vehicle speed VSP is increased beyond the second set vehicle speed V3, the vehicle enters the engine braking region. In such a case, the clutch pressure Pc rises to the specified pressure Pm, the slip of the clutch disappears, and the engine brake operates efficiently.

(C) When the Vehicle is Moving Up a Hill

Due to the hill, the vehicle speed VSP falls. When the vehicle speed VSP falls to the accelerating region below V1, control which increases the clutch pressure Pc to the specified pressure Pm is performed. Therefore, drive force increases, and thus the vehicle speed VSP increases. When the vehicle speed falls even if the clutch pressure Pc increases up to the clutch pressure Pm, the idle-up device 68 for increasing the engine speed operates to attempt to increase the vehicle speed VSP.

If the slope of the hill is steep and the vehicle speed VSP falls further, the operator will depress the accelerator pedal 71 if he intends to drive up the hill. When the operator depresses the accelerator pedal 71, the usual control is performed. Due to the usual control, the engine speed increases and the vehicle speed VSP increases.

(D) When the Vehicle Finishes Climbing the Hill, and Moves Onto a Flat Road

When the vehicle finishes going up the slope, the operator releases the accelerator pedal 71. When the vehicle speed VSP exceeds the second set vehicle speed V3, the vehicle speed VSP is in the engine brake region, and the vehicle speed VSP is decelerated by the engine brake while the clutch pressure Pc is maintained at the specified pressure Pm.

When the vehicle speed VSP falls below the second set vehicle speed V3, the transmitted torque decreases due to lowering of the clutch pressure Pc. Hence, the vehicle speed VSP falls.

In the aforesaid cases, the controller 60 according to this invention can make the vehicle speed converge to the target speed range.

As described above, the controller 60 according to this invention controls the command value IP to the pressure control valve 53 so that the vehicle speed VSP is made to approach the target speed range, and the vehicle speed VSP is maintained within the predetermined range of the target speed.

For this reason, the vehicle speed is maintained at about a constant value both for an operator experienced in operation of a vehicle with a torque converter and for an operator unfamiliar with operation of a vehicle with a torque converter. In this way, the control device according to this invention can improve an operator's ease of operation and productivity.

According to this embodiment, an operator can change the first set vehicle speed V0 on a console panel 69.

Therefore, an experienced operator can improve working efficiency by running the vehicle under creep at high vehicle speeds, by making the first set vehicle speed V0 high. Moreover, an unfamiliar operator can make the vehicle run under creep at very low speed by setting the set vehicle speed V0 to a low speed. Thus, the controller 60 according to this invention can satisfy any operator.

Furthermore, when the creep velocity is regulated so that it is below a regulation speed, it is easy to set the target speed correspondingly to below the regulation speed.

Although the above-mentioned embodiment mainly relates to a fork lift truck with a torque converter, it is applicable also to other industrial vehicles. In particular, the vehicle-running control device according to this invention is highly suited to a vehicle which often runs at very low speed.

Although the invention has been described above by reference to certain embodiment of the invention, the invention is not limited to the embodiment described above.

The second set vehicle speed V3 is preset via the console panel 69, but it may not be a fixed value but a variable value. For example, when the rotation speed of the input shaft 23 of the transmission 20 which can be estimated from the vehicle speed VSP, is equal to the engine speed Ne, this vehicle speed VSP may be set as the second set vehicle speed V3. If this is done, when the speed ratio of the torque converter 11 is over the coupling point, the engine brake can be operated definitely without increasing the clutch pressure Pc to the specified pressure Pm and missing the timing.

Also, the second set vehicle speed V3 may be set to the vehicle speed VSP when the operator requires braking and depresses the inching brake pedal 36. If this is done, operations matching the operator's feeling can be performed.

Moreover, the operating part of the forward/reverse change-over is not limited to a shift lever, and may be push buttons which can select a forward position, reverse position or a non-running (neutral) position. In this case, the forward/reverse detection switch 61 is attached to these buttons.

The entire contents of Japanese Patent Applications P2000-313628 (filed Oct. 13, 2000) are incorporated herein by reference.

Modifications and variations of the embodiment described above will occur to those skilled in the art, in light of the above teachings. The scope of the invention is defined with reference to the following claims.

What is claimed is:

1. A vehicle-running control device having a torque converter connected to an engine, an accelerator pedal, and a forward clutch and reverse clutch for transmitting the torque from the torque converter to an output shaft, the control device comprising:

a hydraulic circuit for operating one of the forward clutch and reverse clutch, the hydraulic circuit having a change-over valve which can be prevented from supplying a pressurized fluid to both the forward clutch and reverse clutch, and a pressure control valve which adjusts the pressure of the pressurized fluid supplied to an operating clutch which is supplied with the pressurized fluid by the change-over valve;

an operating part capable of selecting a forward position in which the change-over valve supplies the pressurized fluid to the forward clutch or a reverse position in which the change-over valve supplies the pressurized fluid to the reverse clutch, a first sensor for detecting said forward or reverse position of the operating part of a forward/reverse change-over;

a second sensor for detecting that the accelerator pedal is released;

a sensor for detecting a vehicle speed; and a controller functioning to:

compare a predetermined target speed range with the vehicle speed, when the operating part is in any of the forward or reverse positions and the accelerator pedal is not depressed, and command the pressure control valve to control the torque transmitted by the operating clutch according to the comparison result, so that the vehicle speed is maintained within the predetermined target speed range.

2. The vehicle-running control device as defined in claim 1, wherein the controller further functions to:

increase the pressure of the fluid supplied to the operating clutch when the vehicle speed is less than the predetermined target speed range, maintain the pressure of the fluid supplied to the operating clutch when the vehicle speed is in the predetermined target speed range, and decrease the pressure of the fluid supplied to the operating clutch when the vehicle speed exceeds the predetermined target speed range.

3. The vehicle-running control device as defined in claim 1, wherein the predetermined target speed range can be changed by a vehicle operator.

4. The vehicle-running control device as defined in claim 1, wherein a width of the predetermined target speed range is substantially zero.

5. The vehicle-running control device as defined in claim 1, wherein the controller further functions to increase a rotation speed of the engine when the vehicle speed is less than the predetermined target speed range.

6. The vehicle-running control device as defined in claim 1, wherein the controller comprises a microprocessor.

7. The vehicle-running control device as defined in claim 1, wherein the controller further functions to increase the pressure of the fluid supplied to the operating clutch up to a specified pressure when the vehicle speed is higher than a set vehicle speed which is above the predetermined target speed range.

8. The vehicle-running control device as defined in claim 7, wherein the vehicle speed when a brake operation is detected, is used as the set vehicle speed.

9. The vehicle-running control device as defined in claim 7, wherein a vehicle speed when an output rotation speed of the torque converter is equal to the engine rotation speed, is used as the set vehicle speed.

10. A vehicle speed control method for a vehicle, the vehicle comprising:

a torque converter connected to an engine;

an accelerator pedal;

a forward clutch and reverse clutch for transmitting the torque from the torque converter to an output shaft; and a hydraulic circuit for operating one of the forward clutch and reverse clutch, the hydraulic circuit having a change-over valve which can be prevented from supplying a pressurized fluid to both the forward clutch and reverse clutch, and a pressure control valve which adjusts the pressure of the pressurized fluid supplied to an operating clutch which is supplied with the pressurized fluid by the change-over valve;

the vehicle speed control method comprising:

selecting a forward position in which the change-over valve supplies the pressurized fluid to the forward clutch or a reverse position in which the change-over valve supplies the pressurized fluid to the reverse clutch;

detecting said forward or reverse position of the operating part of a forward/reverse change-over;

detecting that the accelerator pedal is released;

detecting a vehicle speed;

comparing a predetermined target speed range with the vehicle speed, when the operating part is in any of the forward or reverse positions and the accelerator pedal is not depressed; and commanding the pressure control valve to control the torque transmitted by the operating clutch according to the comparison result, so that the vehicle speed is maintained within the predetermined target speed range.

11. A vehicle-running control device having a torque converter connected to an engine, an accelerator pedal, and a forward clutch and reverse clutch for transmitting the torque from the torque converter to an output shaft, the control device comprising:

a hydraulic circuit for operating one of the forward clutch and reverse clutch, the hydraulic circuit having a change-over valve which can be prevented from supplying a pressurized fluid to both the forward clutch and reverse clutch, and a pressure control valve which adjusts the pressure of the pressurized fluid supplied to an operating clutch which is supplied with the pressurized fluid by the change-over valve;

means for selecting a forward position in which the change-over valve supplies the pressurized fluid to the forward clutch or a reverse position in which the change-over valve supplies the pressurized fluid to the reverse clutch;

means for detecting said forward or reverse position of the operating part of a forward/reverse change-over;

means for detecting that the accelerator pedal is released;

means for detecting a vehicle speed;

means for comparing a predetermined target speed range with the vehicle speed, when the operating part is in any of the forward or reverse positions and the accelerator pedal is not depressed; and means for commanding the pressure control valve to control the torque transmitted by the operating clutch according to the comparison result, so that the vehicle speed is maintained within the predetermined target speed range.

* * * * *